(12) United States Patent
Wang et al.

(10) Patent No.: US 7,144,239 B2
(45) Date of Patent: Dec. 5, 2006

(54) MOLDING APPARATUS WITH A MOLDING FLOWABILITY SENSOR FOR PACKAGING SEMICONDUCTOR DEVICE

(75) Inventors: Wei-Chih Wang, Kaohsiung (TW); Kuang-Lin Lo, Kaohsiung (TW); Yun-Lung Chang, Kaohsiung (TW)

(73) Assignee: Advanced Semiconductor Engineering, Inc., Kaoshiung (TW)

( * ) Notice: Subject to any disclaimer, the term of this patent is extended or adjusted under 35 U.S.C. 154(b) by 264 days.

(21) Appl. No.: 10/901,039

(22) Filed: Jul. 29, 2004

(65) Prior Publication Data

US 2005/0089594 A1    Apr. 28, 2005

(30) Foreign Application Priority Data

Oct. 24, 2003    (TW) ............................... 92129689 A

(51) Int. Cl.
*B29C 45/77*    (2006.01)
(52) U.S. Cl. .................................... 425/170
(58) Field of Classification Search ............. 425/116, 425/169, 170
See application file for complete search history.

(56) References Cited

U.S. PATENT DOCUMENTS 4,426,341 A *   1/1984   Tsuzuku et al. ............ 264/40.1
6,345,974 B1 *  2/2002   Kawasaki et al. ........... 425/149

FOREIGN PATENT DOCUMENTS

| JP | 54097660 A | * | 8/1979 |
| JP | 02122636 A | * | 5/1990 |
| JP | 02163946 A | * | 6/1990 |
| JP | 06053263 A | * | 2/1994 |
| JP | 10256287 A | * | 9/1998 |
| JP | 11176853 A | * | 7/1999 |
| JP | 2002076041 A | * | 3/2002 |

OTHER PUBLICATIONS

Dominick Rostao et al, Injection Molding Handbook, 2000, Kluwer Academic Publishers, 3rd edition, pp. 667-682.*
Gunter Mennig, Mold-Making Handbook, 1998, Hanser Publishers, 2nd edition, pp. 518-519.*

* cited by examiner

*Primary Examiner*—Robert B. Davis
(74) *Attorney, Agent, or Firm*—Bacon & Thomas, PLLC

(57) ABSTRACT

A molding apparatus mainly comprises a mold chase holder, a mold chase, a heater and a molding flowability sensor. The mold chase comprises a mold cavity and a via, wherein the via penetrates a mold-cavity surface of the mold cavity. The mold chase is accommodated by a mold chase holder and there is a heater, for heating the mold chase up, disposed therein. And the molding flowability sensor for measuring the molding flowability of the instant molding flow at the mold-cavity surface of the mold cavity is provided at the mold-cavity surface of the mold cavity.

3 Claims, 3 Drawing Sheets

MOLDING APPARATUS WITH A MOLDING FLOWABILITY SENSOR FOR PACKAGING SEMICONDUCTOR DEVICE

BACKGROUND OF THE INVENTION

1. Field of Invention

This invention relates to a molding apparatus. More particularly, the present invention is related to a molding apparatus having a molding flowability sensor disposed at the surface of the mold cavity.

2. Related Art

Integrated circuits (chip) packaging technology is becoming a limiting factor for the development in packaged integrated circuits of higher performance. Semiconductor package designers are struggling to keep pace with the increase in pin count, size limitations, low profile, and other evolving requirements for packaging and mounting integrated circuits. Nowadays, ball grid array package (BGA) and chip scale package (CSP) are wildly applied to chip package with high I/Os and assembly package for thermal enhance integrated circuits.

However, as above-mentioned ball grid array package, encapsulation plays an important role. Specifically, there is needed a stable molding or encapsulation flow for encapsulating the integrated circuits device so as to have the liquid encapsulation injected into the mold chase stably and distributed equally in the mold chase. In such a manner, the appearance of said package will be kept in a good condition after the integrated circuits device is encapsulated.

In general, the molding apparatus as shown in FIG. 1 mainly comprises a mold chase holder 110, a mold chase 120 and a heater 130. Therein, the mold chase holder 110 is utilized to accommodate the mold chase 120 and said mold chase 120 has a plurality of mold cavities 121. In addition, the heater 130 is disposed in the mold chase holder 110 to heat the mold chase 120. Because there is no measurement disposed in the mold chase 120 to measure the molding flowability and there is only a spiral flow tool utilized to measure the molding flowability of the instant molding flow, namely the instant molding flowability, after the encapsulation, there is no idea to be caught to realize the actual molding flowability at the surface of the mold cavity 121. Thus, the measurement data, such as molding flowability, measured by the spiral flow tool is usually different from that of actual molding flow.

Consequently, providing another molding apparatus to solve the mentioned-above disadvantages is the most important task in this invention.

SUMMARY OF THE INVENTION

In view of the above-mentioned problems, this invention is to provide a molding apparatus having a molding flowability sensor disposed at the surface of the mold cavity to directly measure the flowability of the instant molding flow so as to get all related characterization of encapsulation for reference to ensure the quality of the encapsulation utilized in packaging integrated circuits devices.

To achieve the above-mentioned, a molding apparatus is provided, wherein the molding apparatus at least comprises a mold chase holder, a mold chase, a heater, a molding flowability sensor. Therein, the mold chase has a mold cavity, and the mold cavity has a mold-cavity surface. In addition, the mold chase holder is utilized to accommodate the mold chase, and the heater is disposed in the mold chase holder to heat the mold chase. To be noted, the molding flowability sensor is disposed at the mold-cavity surface to measure the molding flowability of the instant molding flow.

As mentioned above, the molding flowability sensor is disposed at the mold-cavity surface so that the actual molding flowability of the instant molding flow located at the mold-cavity surface could be gotten. Thus, those who can take the actual data, such as molding flowability, as reference to get all related characterization of encapsulation to ensure the quality of the encapsulation utilized in packaging integrated circuits devices.

BRIEF DESCRIPTION OF THE DRAWINGS

The invention will become more fully understood from the detailed description given herein below illustrations only, and thus are not limitative of the present invention, and wherein.

DETAILED DESCRIPTION OF THE INVENTION

The molding apparatus according to the preferred embodiment of this invention will be described herein below with reference to the accompanying drawings, wherein the same reference numbers refer to the same elements.

Figure 1:
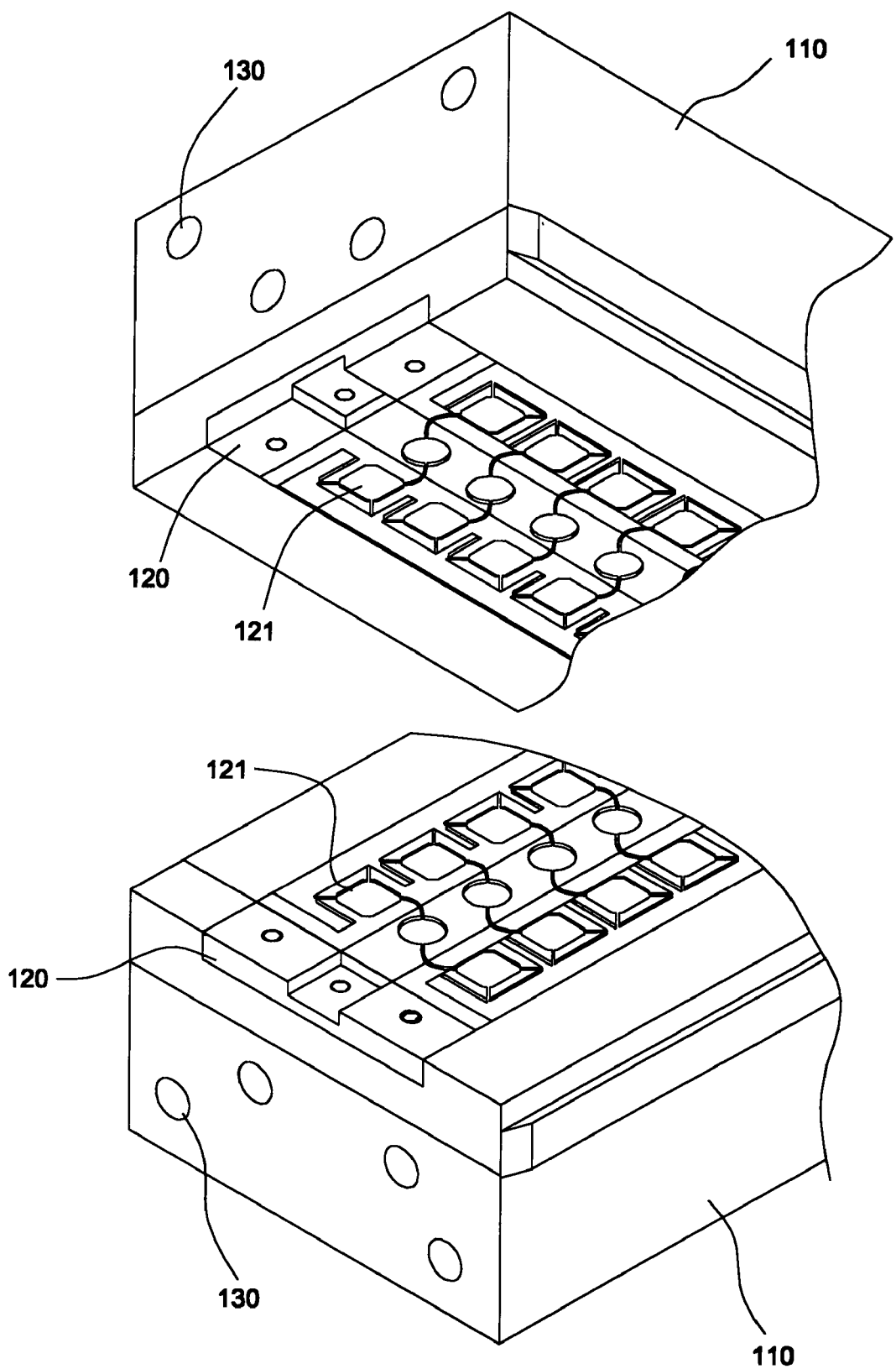
FIG. 1 is a schematic figure illustrating the conventional molding apparatus.
Figure 2:
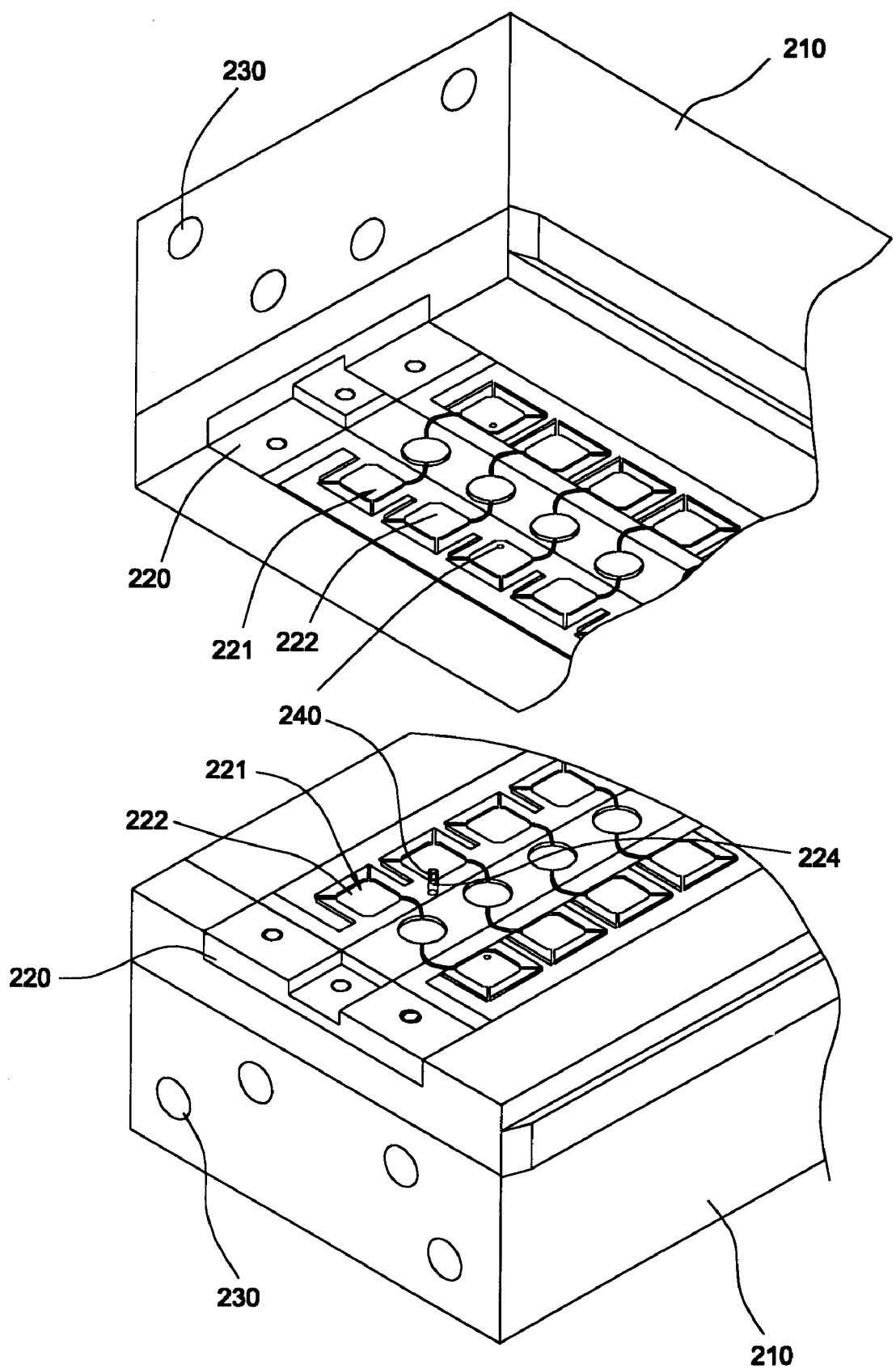
FIG. 2 is a schematic figure illustrating the molding apparatus having a molding flowability sensor therein according to the preferred embodiment of the present invention.
Figure 2A:
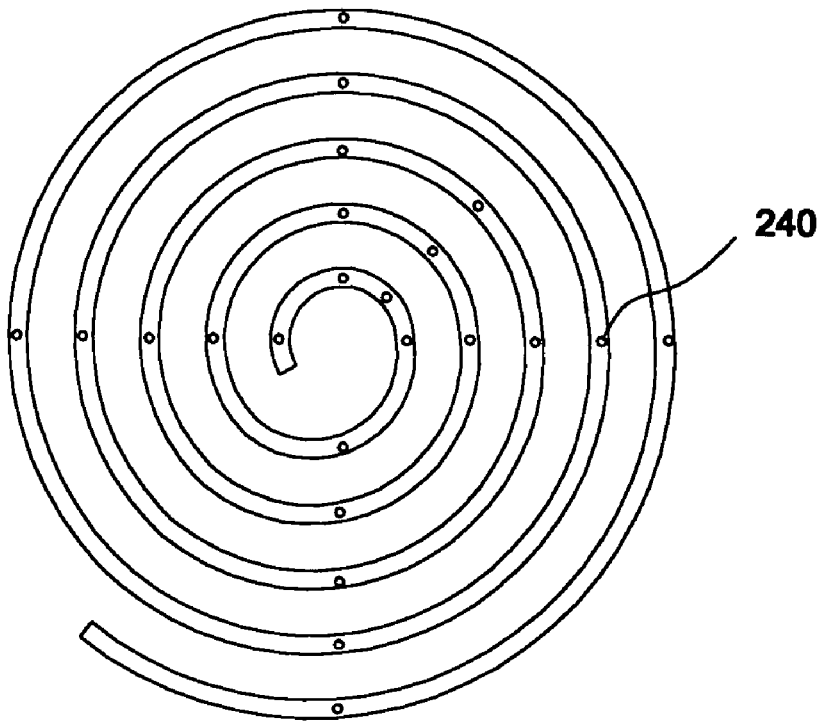
FIG. 2A is a schematic figure illustrating the molding flowability sensor arranged in a spiral type according to the embodiments of FIG. 2.
Figure 2B:
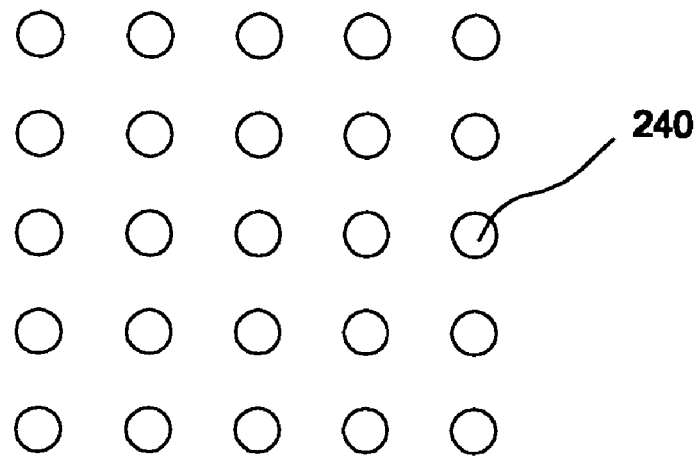
FIG. 2B is a schematic figure illustrating the molding flowability sensor arranged in a matrix type according to the embodiments of FIG. 2.

In accordance with a preferred embodiment as shown in FIG. 2, there is provided a molding apparatus. And FIG. 2A and FIG. 2B illustrate the molding flowability sensor disposed at the mold-cavity surface in a spiral type and a matrix type respectively.

Referring to FIG. 2 again, the molding apparatus mainly comprises a mold chase holder 210, a mold chase 220, a heater 230, and a molding flowability sensor 240. Therein, the mold chase 220 has a plurality of mold cavities 221, and each mold cavity 221 has a mold-cavity surface 222. Therein, the mold chase holder 210 is utilized to accommodate the mold chase 220; and, the heater 230 is disposed in the mold chase holder 210 to heat the mold chase 220. To be noted, the mold flowability sensor 240 is disposed at the mold-cavity surface 222 to measure the molding flowability of the instant molding flow located at the mold-cavity surface 222, and furthermore there shall be a plurality of molding flowability sensors disposed at the mold-cavity surfaces 222 and the molding flowability sensors 240 can be arranged in a spiral type or a matrix type as shown in FIG. 2A and FIG. 2B respectively. Besides, the molding flowability sensor 240 can be disposed in a via 224 penetrating the mold-cavity surface 222 and located close to the mold-cavity surface 222.

As mentioned above, the molding flowability sensor 240 is disposed at the mold-cavity surface 222 so that the actual molding flowability of the instant molding flow located at the mold-cavity surface 222 could be gotten. Thus, those who can take the actual data as reference to get all related characterization of encapsulation so as to ensure the quality of the encapsulation utilized in packaging integrated circuits devices and enhance the reliability of the package.

Although the invention has been described in considerable detail with reference to certain preferred embodiments, it will be appreciated and understood that various changes and modifications may be made without departing from the spirit and scope of the invention as defined in the appended claims.

What is claimed is:

1. A molding apparatus, comprising:

a mold chase, the mold chase having a plurality of mold cavities, wherein each of the mold cavities has a mold-cavity surface;

a mold chase holder; and a plurality of molding flowability sensors disposed at one of the mold-cavity surfaces, wherein the molding flowability sensors are arranged in a spiral type.

2. The molding apparatus of claim 1, further comprising a heater disposed in the mold chase holder.

3. The molding apparatus of claim 1, further comprising a plurality of vias penetrating the mold-cavity surface wherein each of the molding flowability sensors is disposed in each via, respectively.

* * * * *